(12) United States Patent
Copenhaver et al.

(10) Patent No.: US 7,840,852 B2
(45) Date of Patent: Nov. 23, 2010

(54) METHOD AND SYSTEM FOR ENVIRONMENTALLY ADAPTIVE FAULT TOLERANT COMPUTING

(75) Inventors: Jason L. Copenhaver, Sarasota, FL (US); Ramos Jeremy, Clearwater, FL (US); Jeffrey M. Wolfe, Parrish, FL (US); Dean Brenner, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 524 days.

(21) Appl. No.: 11/202,467

(22) Filed: Aug. 12, 2005

(65) Prior Publication Data

US 2007/0022318 A1 Jan. 25, 2007

Related U.S. Application Data

(60) Provisional application No. 60/620,047, filed on Oct. 19, 2004.

(51) Int. Cl.
*G06F 11/00* (2006.01)
(52) U.S. Cl. .......................................... 714/47; 714/10
(58) Field of Classification Search .................. None
See application file for complete search history.

(56) References Cited

U.S. PATENT DOCUMENTS

| | | | | |
|---|---|---|---|---|
| 4,970,644 A | * | 11/1990 | Berneking et al. | 702/6 |
| 5,022,027 A | * | 6/1991 | Rosario | 714/15 |
| 5,323,337 A | * | 6/1994 | Wilson et al. | 702/73 |
| 5,487,149 A | * | 1/1996 | Sung | 714/10 |
| 6,738,930 B1 | * | 5/2004 | Medin et al. | 714/30 |
| 7,080,290 B2 | * | 7/2006 | James et al. | 714/47 |
| 7,237,023 B2 | * | 6/2007 | Menard et al. | 709/224 |
| 2002/0046365 A1 | * | 4/2002 | Avizienis | 714/43 |
| 2004/0210800 A1 | * | 10/2004 | Vecoven et al. | 714/47 |
| 2005/0005203 A1 | * | 1/2005 | Czajkowski | 714/47 |
| 2007/0022318 A1 | * | 1/2007 | Copenhaver et al. | 714/11 |

OTHER PUBLICATIONS

Donohoe et al. 'Adaptive Computing for space'. IEEE 1999. Ramos et al. 'Environmentally Adaptive Fault Tolerant Computing'. IEEE 2004. Broderick et al. 'Error Detection for Adaptive Computing Architectures in Spacecraft Applications'. IEEE 2001.*
Brebner et al. 'Reconfigurable compuitgn in Remote and Harsh Environment'. 1999.*

(Continued)

*Primary Examiner*—Yolanda L Wilson
(74) *Attorney, Agent, or Firm*—Fogg & Powers LLC

(57) ABSTRACT

A method and system for adapting fault tolerant computing. The method includes the steps of measuring an environmental condition representative of an environment. An on-board processing system's sensitivity to the measured environmental condition is measured. It is determined whether to reconfigure a fault tolerance of the on-board processing system based in part on the measured environmental condition. The fault tolerance of the on-board processing system may be reconfigured based in part on the measured environmental condition.

22 Claims, 9 Drawing Sheets

OTHER PUBLICATIONS

Gailser Research. 'Suitability of reprogrammable FPGAs in space applications'. Sep. 2002. microelectronics.esa.int/techno/fpga_002_01-0-4.pdf.*

Beahan, John et al., "Detailed Radiation Fault Modeling of the Remote Exploration and Experimentation (REE) First Generation Testbed Architechture," *IEEE Aerospace Conference Proceedings* (2000) pp. 279-281.

Kalbarczyk, Zbingniew et al., "Application Fault Tolerance with Armor Middleware," *IEEE Internet Computing* (Mar.-Apr. 2005) pp. 24-33.

Kats, Daniel S., "Computer 2003.pdf", Keywords: NASA, robot, space exploration, computer.

Kim, K.H. (Kane), "Middleware of Real-Time Object Based Fault-Tolerant Distributed Computing systems: Issues and Some Approaches," *Pacific Rim International Symposium on Dependable Computing* (2001) pp. 3-8.

Kim, K.H. (Kane), "A Middleware Architecture for Real-Time Object-Oriented Adaptive Fault Tolerance Support," *Paper Presentation*.

Lala, Jaynarayan H. et al., "A Dependability Architecture Framework for Remote Exploration & Experimentation Computers" (1999).

Madiera, Henrique et al., "Experimental Evaluation of a COTS System for Space Applications," *Proceedings of the International Conference on Dependable Systems and Networks* (2002) pp. 325-330.

Sengupta, R. et al., "Software Fault Tolerance for Low-to-Moderate Radiation Environments," *Astronomical Data Analysis Software and Systems X—ASP Conference Series*, vol. 238 (2001) pp. 257-260.

Some, Raphael R., "High Performance Computing in Dependable Space Systems," *Proceedings—IEEE Pacific Rim International Symposium on Dependable Computing* (Mar. 2004) p. 335.

Some, Raphael R. et al., "REE: a COTS-Based Fault Tolerant Parallel Processing Supercomputer for Spacecraft Onboard Scientific Data Analysis," *AIAA/IEEE Digital Avionics Systems Conference—Proceedings* (Oct. 1999) pp. 7.B.3-1-7.B.3.12.

Unknown Author, "Application Fault Tolerance with Armor Middleware" *PowerPoint Presentation*, pp. 1-50.

Whisnant, K. et al., "An experimental Evaluation of the REE SIFT Environment for Spaceborne Applications," *Proceedings of the International Conference on Dependable Systems and Networks* (2002) pp. 585-594.

Whisnant, K. et al., "A System Model for Dynamically Reconfigurable Software," *IBM Systems Journal*, vol. 42, No. 1 (2003) pp. 45-59.

Whisnant, Keith et al., "The Effects of an ARMOR-Based SIFT Environment on the Performance and Dependability of User Applications," *IEEE Transactions of Software Engineering*, vol. 30, No. 4 (Apr. 2004) pp. 1-21).

* cited by examiner

METHOD AND SYSTEM FOR ENVIRONMENTALLY ADAPTIVE FAULT TOLERANT COMPUTING

GOVERNMENT RIGHTS

The United States Government may have acquired certain rights in this invention pursuant to Contract No. NM0710209 awarded by the NASA.

BACKGROUND

I. Field of the Invention

The present invention is directed to mitigating radiation induced faults. More particularly, the present invention is directed to a method and/or system for handling an inherent susceptibility of Commercial-Off-The-Shelf ("COTS") components to Single Event Upsets ("SEUs"). The invention is particularly useful in providing real time environmental sensing, utilizing a COTS based computer architecture that supports adaptable configuration levels of fault tolerance, while also increasing performance and efficiency while maintaining reliable operation. However, aspects of the invention may be equally applicable in other scenarios as well.

II. Description of Related Art

Science and defense missions alike have increasing demands for data returns from their space born assets. In more recent times, there has been an increase in the capability of the instruments deployed in space. For example, such an increase has been discussed in the following references which are herein entirely incorporated by reference and to which the reader is directed to for further information: "An Overview of Earth Science Enterprise", NASA Goddard Space Flight Center, FS-2002-3-040-GSFC, March 2002; Wallace M. Porter And Harry T. Enmark, "A System Overview of The Airborne Visible/Infrared Imaging Spectrometer (AVIRIS)", JPL Pasadena, Calif.; and H. L. Huang, "Data Compression of High-spectral Resolution Measurements", Satellite Direct Readout Conference for the Americas, December 2002.

In one typical approach for data gathering, data compression and data transmission no longer appears sustainable. It is difficult to transmit a vast amount of data via available downlink channels in a reasonable period of time. One proposed solution to such a situation is to reduce demand on a downlink by moving processing away from earth and onto the space born asset.

However, there are certain limitations to such an approach. For example, this approach is hampered by limited capabilities of conventional on-board processors. It is also prohibitive based on the cost of developing radiation hardened high-performance electronics. Such issues are discussed in the references J. Marshall and R. Berger, "A Processor Solution for the Second Century of Powered Space Flight," Digital Avionics Systems Conferences, 2000. Proceedings. DASC. The 19th Volume: 2, 7-13 Oct. 2000, Pages: 8.A.2_1-8.A.2_8 and Gary R. Brown, "Radiation Hardened PowerPC 603e™ Based Single Board Computer," 20$^{th}$ Digital Avionics Systems, 2001. October 2001 herein entirely incorporated by reference and to which the reader is directed for further information.

Based in part on these perceived concerns, the relevant industry has considered the use of COTS components. For example, such general considerations are generally described in the reference E. R. Prado et al., "A Standard Approach to Spaceborne Payload Data Processing," IEEE Aerospace Conference, March 2001 herein entirely incorporated by reference and to which the reader is directed for further information. Furthermore, a more recent adoption of silicon-on-insulator ("SOI") technology by COTS integrated circuit foundries has also resulted in devices with moderate space radiation tolerance. See, e.g., the references F. Irom et al., "Single-Event Upset in Evolving Commercial Silicon-on-Insulator Microprocessor Technologies, Nuclear and Space Radiation Effects Conference 2003 and Xilinx Corporation, "QPro Virtex 2.5V Radiation Hardened FPGA," Xilinx Web site http://www.xilinx.com/, November 2001 herein entirely incorporated by reference and to which the reader is directed for further information.

Despite such progress, COTS components continue to be somewhat highly susceptible to SEUs. One popular approach for mitigating such SEUs is to employ fixed component level redundancy. See, e.g., Daniel P. Siewiorek and Robert S. Swarz, Reliable Computer Systems Design and Evaluation 3$^{rd}$ edition, MA: AK Peters Ltd., 1998 herein entirely incorporated by reference and to which the reader is directed for further information. However, one disadvantage of utilizing fixed component level redundancy is its low efficiency and its unrealized system capacity.

Certain conventional onboard processing computers consist mostly of radiation hardened components based on COTS equivalents. Though COTS compatibility offers certain perceived benefits, including adoption of commercial software, typically large amounts of Non-Recurring Engineering (NRE) are often required for an initial silicon implementation. Additionally, radiation hardened components often lag their commercial counterparts in overall performance and capability by at least 1 to 2 orders of magnitude. There are a number of factors that contribute to this deficiency. One such factor relates to radiation-hardening techniques and that such techniques for microelectronics require the use of fixed transistor or gate level redundancy. This additional logic increases the power required to perform the same unit of computation.

An approach towards improvement concerns the use of true COTS microprocessors and Field Programmable Gate Arrays ("FPGAs"). Typically, such an approach avoids the high cost and long development time associated with radiation hardened equivalents. However, true COTS devices are typically quite susceptible to SEUs. One popular SEU mitigation approach is to use component level N-module redundancy. However, such N-module redundancy often results in low efficiency and low capacity due to an overhead that often approaches ⅔, or more.

Furthermore, the level of redundancy is fixed and is often unnecessary. To overcome the deficiencies of fixed redundancy, two characteristics of space missions may be focused on: first, the variability of space environment and second, the task level criticality. Most missions will have a mix of processes with varying criticality. This characteristic of mission processing can be exploited to increase a systems efficiency by applying redundancy at a task level. Furthermore, there is a variability involved in a space environment and this variability provides a temporal and orbital position dependency on the necessary redundancy.

There is, therefore, a general need for a method and/or system for the mitigation of radiation induced faults ("SEUs"). There is also a general need for a method and system that can utilize lower cost COTS components in space which exhibit acceptable overall TID and Latch Up characteristics, but are still susceptible to SEUs. A further need exists for a system and/or method that facilitates the use of COTS components in SEU abundant environments, while also maintaining adequate levels of system efficiency and capacity.

There is a further need for such systems and methods of accomplishing such adequate levels of system efficiency and capacity by adaptively configuring a level of fault tolerance in a system as mandated by a mission environment and/or a mission application. Consequently, there is a general need for real time environmental sensing, utilizing a COTS based computer architecture that supports adaptable configuration levels of fault tolerance, while also optimizing performance and efficiency while maintaining reliable operation.

SUMMARY

According to an exemplary embodiment, a method of adapting fault tolerant computing comprises the steps of measuring an environmental condition representative of an environment and analyzing an on-board processing system's sensitivity to the measured environmental condition; and determining whether to reconfigure a fault tolerance of the on-board processing system based in part on the measured environmental condition.

In an alternative embodiment, a system for environmentally adaptive fault tolerant computing (EAFTC) comprises a sensor that senses a characteristic of a dynamic environment and generates an output signal based on the characteristic. A system configuration controller receives the output signal, the controller assessing a potential environmental threat to an availability of the system based in part on the output signal. A computing device receives an input from the controller. A configuration of the computing device is adapted to effectively mitigate the potential environmental threat to the system's availability.

These as well as other advantages of various aspects of the present invention will become apparent to those of ordinary skill in the art by reading the following detailed description, with appropriate reference to the accompanying drawings.

BRIEF DESCRIPTION OF DRAWINGS

An exemplary embodiment of the present invention is described herein with reference to the drawings, in which.

DETAILED DESCRIPTION

A. General Overview of EAFTC System

Figure 1:
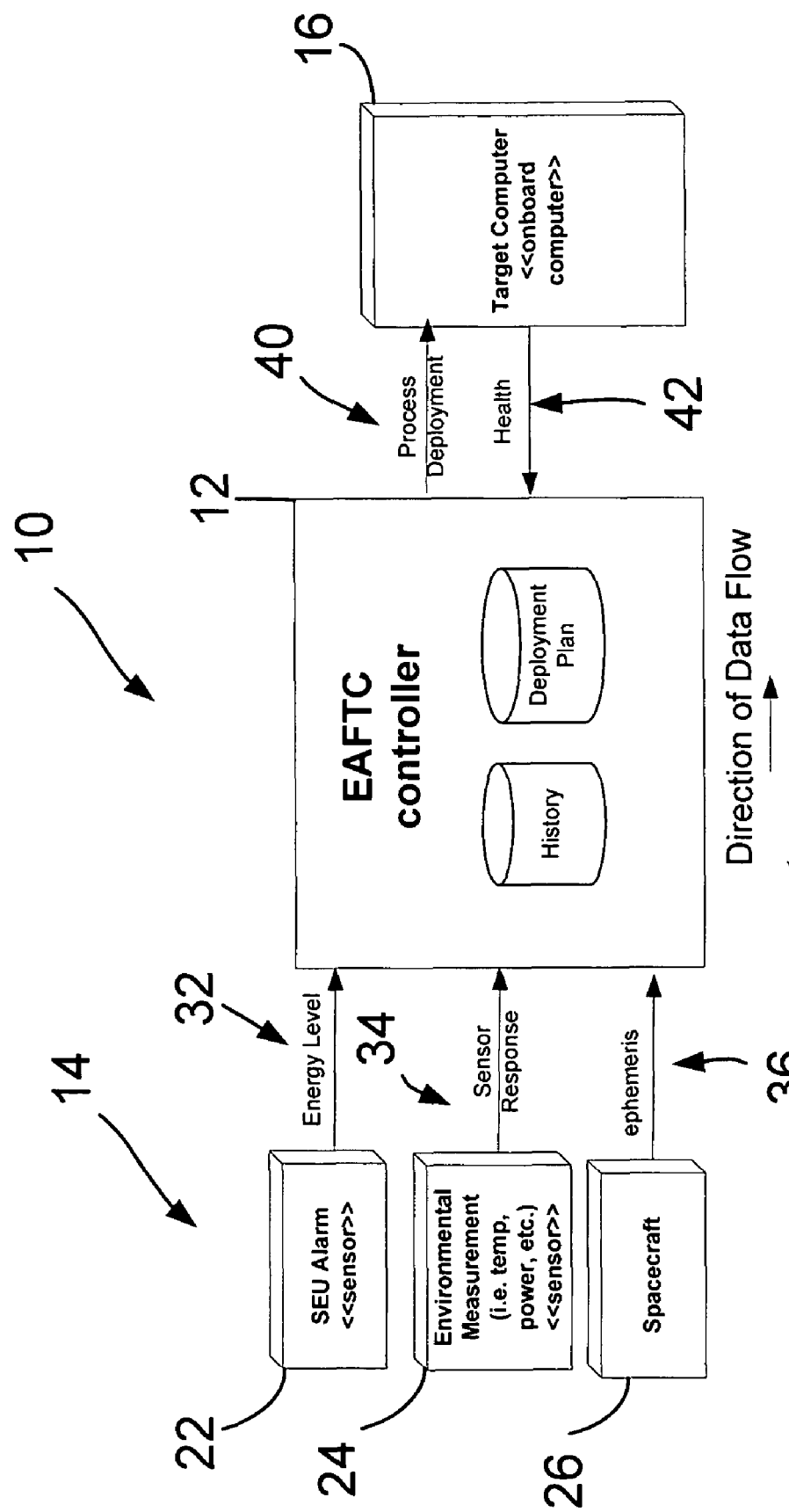
FIG. 1 illustrates one arrangement of an EAFTC based system incorporating aspects of the present invention.

FIG. 1 illustrates an exemplary block diagram of a first arrangement for an EAFTC based system 10. Preferably, EAFTC based system 10 employs a system level fault tolerance based on historical and/or environmental conditions. EAFTC system 10 comprises an EAFTC controller 12, an environmental sensor suite 14, and a target computer 16. EAFTC controller 12 comprises history 18 and a deployment plan 20. Sensor suite 14 preferably comprises a plurality of sensors including but not limited to a SEU alarm 22, environment measurement 24, and the spacecraft 26. Other sensor suite arrangements are also possible.

A preferred process implemented by the arrangement illustrated in FIG. 1 includes the following steps: First, sensor suite 14 provides a method of sensing an environmental condition. For example, sensor suite 14 can provide an energy level indication 32 from SEU alarm 22, a sensor response 34 from environmental measurement 24, or alternatively ephemeris 36 from spacecraft 26. Once such signal or signals are received, EAFTC controller 12 evaluates the environmental condition (which may be an environmental threat) to the system's 10 availability. If EAFTC controller 12 determines that such an environmental threat exists, system 10 then adapts (if deemed necessary) a configuration of target computer 16. In this manner, system 10 effectively and dynamically mitigates potential threats presented by the environment. As seen from FIG. 1, the direction of data flow 38 proceeds from sensor suite 14 through EAFTC controller 12 and then towards target computer 16.

In general, EAFTC controller 12 may be implemented to accept various different environmental inputs from sensor suite 12 that can induce faults in target computer 16, such as a payload computer system. However, for a particular arrangement presently discussed herein, environmental monitoring may be focused on measurements of high-energy particle flux such that may occur in a space born asset. For example, in such the situation where the EAFTC system 10 is provided in a spacecraft, by monitoring flux of high-energy particles, it is possible to assess the systems overall susceptibility to SEUs. However, those of ordinary skill in the art will recognize that alternative measurement and system arrangements and/or alternative environmental inputs may also be utilized.

Returning to FIG. 1, sensor measurements (e.g., temperature, available power, etc) and a state of health of target computer 16 are continuously monitored by EAFTC controller 12 via health signal 42. Such information and data 42 are combined with a mission defined application task deployment plan. Preferably, the mission defined application task deployment plan contains task level criticality requirements as well as other pertinent information used by EAFTC controller 12. Based on that input, EAFTC controller 12 determines whether there exists any reliability and/or availability threat and preferably the level of such threat posed by the present environment in which the asset resides on target computer 16.

EAFTC controller 12, which acts as a system configuration controller, then generates the requisite signals by way of process deployment which are then sent to adapt target computer. In this manner, the process deployment 40 will counter a potential hostile environmental threat to computer 16. Based on the threat assessment the system configuration controller 12 reconfigures the on-board processing system fault tolerance to match the threat level. The on-board processing system preferably implements configurable fault tolerance that match the variable threats that will be encountered by the system. In response, target computer 16 optimally employs the requested fault tolerant mechanism. This process is performed in real-time and on-line as an integral part of overall operation of system 10.

Hardware Implementation

As may be seen from FIG. 1, EAFTC controller 12 receives certain commands from a target computer 16 by way of health signal 42. In one preferred arrangement, hardware for target computer 12 may comprise Honeywell's Integrated Payload System. The Honeywell Integrated Payload System is essentially a cluster computer consisting of a multitude of data processors and one cluster manager.

Figure 2:
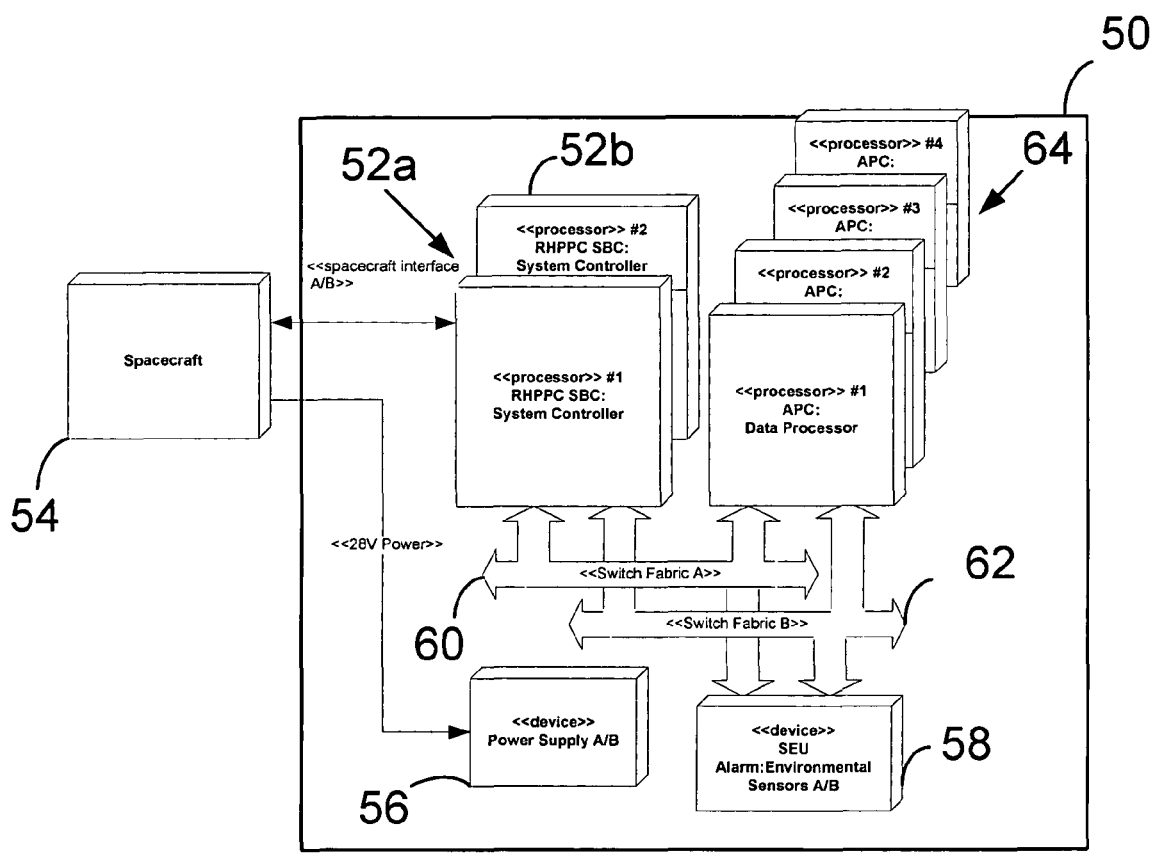
FIG. 2 illustrates one arrangement of a target computer that may be utilized with the EAFTC based system illustrated in FIG. 1.

FIG. 2 illustrates one arrangement of a target computer 50 that may be utilized with EAFTC system 10 illustrated in FIG. 1. In this arrangement, target computer 50 comprises various hardware elements including a system controllers 52a and 52b, a plurality of data processors 64a, 64b, 64c, and 64d, a first packet switched fabric 62a, a second packet switched fabric 62b, and an environmental sensor suite 58. A power supply 56 is also provided.

A. System Controller

System controller 52 for target computer 50 is preferably implemented using redundant, Radiation Hardened Single Board Computers. Such a reliable radiation hardened system controller 52 provides a platform for deployment of critical control software such as the EAFTC controller. For example, in one arrangement, a potential candidate for a system controller 52 may comprise a Honeywell radiation hardened RHPPC Single Board Computer ("SBC"). See, for example, the description as provided by Gary R. Brown, "Radiation Hardened PowerPC 603e Based Single Board Computer," IEEE Aerospace Conference, 2001 (http://cism.jpl.nasa.gov/events/seminardocs/Big_sky_08_02_01.pdf).

In one preferred arrangement, radiation hardened SBC is based on Motorola 603e microprocessor technology. Such a radiation hardened SBC is generally described in Gary R. Brown, "Radiation Hardened PowerPC 603e™ Based Single Board Computer," 20$^{th}$ Digital Avionics Systems, 2001. October 2001 herein entirely incorporated by reference and to which the reader is directed to for further information. The use of an RHPCC SBC may be preferred for a number of reasons. Some of these reasons are summarized in Table 1 provided below:

TABLE 1

RHPPC SBC Features

Salient Features
3.3 V and 5.0 V Power
RHPPC delivering 100 MIPS
Peripheral Enhancement Component support chip
4 MB EEPROM with Single Error Correction and Double Error Detection
512 KB EEPROM
128 MB DRAM with SuperEDAC
6 U × 220 mm Euro Card Form Factor
Max Power Draw 15 W
Mass >3 lbs
Redundant 1553 (interface to spacecraft computer)
32-bit 33 MHz PCI (interface to cluster and MIB electronics)

B. Data Processors

As illustrated in FIG. 2, target computer 50 further comprises a plurality of data processors 64. In this preferred arrangement, plurality of data processors comprise a first, a second data, a third, and a fourth data processor 64a, b, c, and d, respectively. In one preferred arrangement, these data processors comprise COTS based processors. More preferably, these data processors comprise COTS based processors comprising a unique architecture herein referred to as an Adaptive Processing Computer ("APC"). APC is a multi-mode device that combines the use of COTS microprocessors and FPGAs on a single platform. In one arrangement, the APC employs a COTS IBM PowerPC 750FX microprocessor and a Xilinx VirtexII 6000 FPGA. The IBM 750fx and Xilinx VirtexII devices are suitable COTS devices for flight experiment.

C. Adaptive Processing Computer

Figure 3:
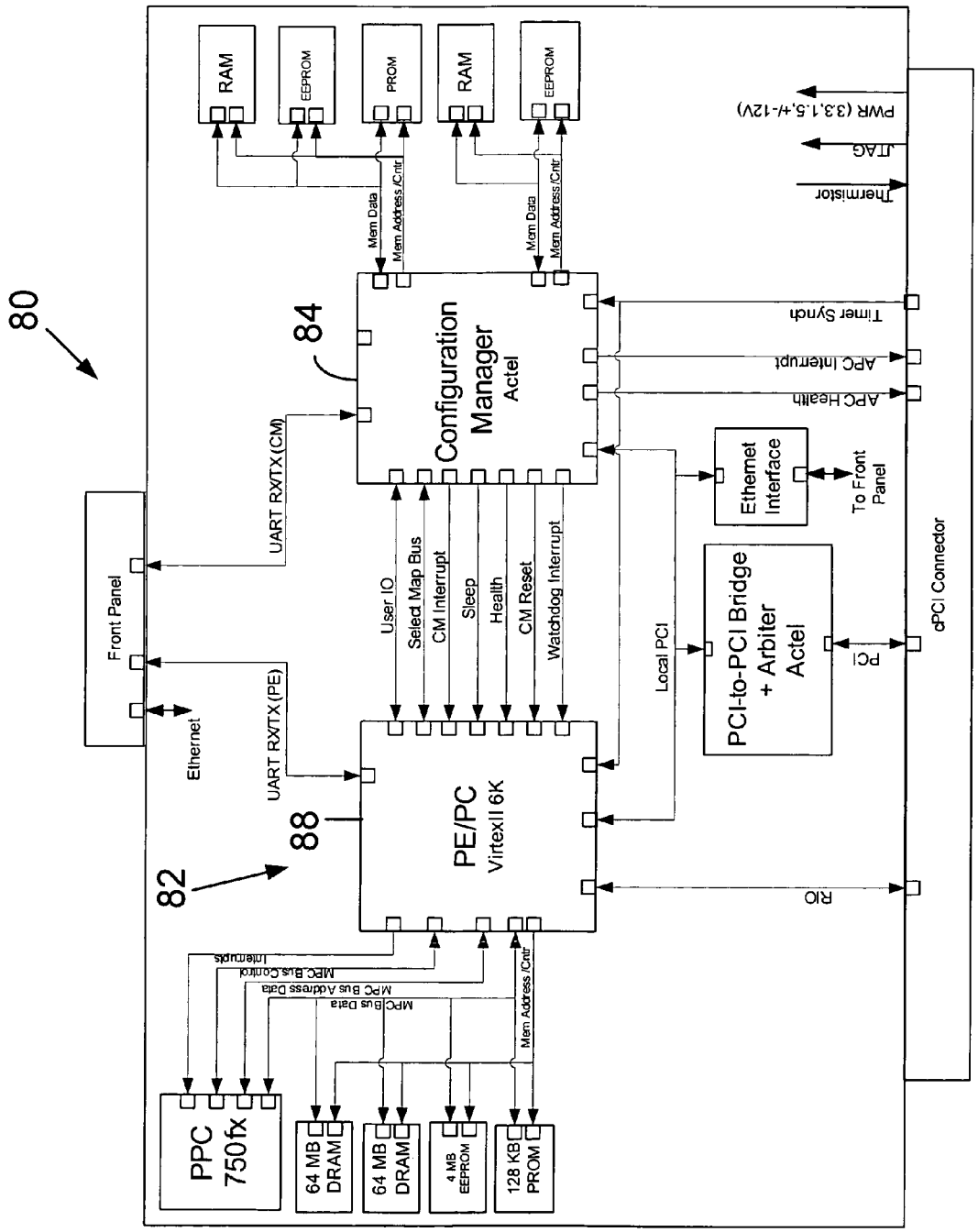
FIG. 3 illustrates one arrangement of an adaptive processing computer that may be utilized with the target computer illustrated in FIG. 2.

FIG. 3 illustrates one arrangement of an adaptive processing computer ("APC") 80 that may be utilized with target computer 50 illustrated in FIG. 2. APC 80 comprises a COTS compute resources portion 82 and a portion comprising a radiation hardened configuration manager 84 along with supporting functions. Configuration manager 84 handles various functions including but not limited to mode changes of APC 80, basic FPGA configuration, FPGA configuration memory scrubbing, low-level health monitoring, and power mode control.

In one preferred arrangement, APC 80 may implement a plurality of operational modes of operation. For example, APC 80 may implement a microprocessor mode, a custom processor mode, and a hybrid processor mode. The mode of operation may be determined by the active configuration of a FPGA labeled Processing Element/Processor Controller ("PE/PC") 88 in FIG. 3.

1. Microprocessor Mode

APC 80 may be configured in a microprocessor mode. While in this mode, APC's FPGA is configured as a Processor Controller and the microprocessor is enabled. As such, APC behaves much like a SBC. Processor Controller FPGA hosts all of the support functions for PPC including IO, memory controller, interrupts, timers, etc.

2. Custom Process

When enabled as a custom process, microprocessor is disabled and does not execute software. While APC 80 is in this custom process mode, FPGA of PE/PC 88 is configured as a Processing Element and hosts a full-custom application including all IO and processing logic. The processing logic in Processing Element is defined by an image loaded into FPGA's configuration memory by configuration manager 84. Configuration manager 84 receives commands from software on system controller 52 of target computer 16 (see FIG. 2).

3. Hybrid Mode

The third APC capability is a hybrid mode operation. In the hybrid mode, FPGA hosts processor controller for microprocessor as well as application specific modules. This third alternative mode can be likened to a co-processor system. The application specific modules could be Digital Signal Processing ("DSP") functions, data compression, vector processors, etc. As with the custom mode, the use of application specific modules may result in high efficiency and performance yields. For example, a general description of such efficiencies and performance yields is generally described in J. S. Donaldson, "Push the DSP Performance Envelop," Xilinx Xcell Journal, Spring 2003 herein entirely incorporated by reference and to which the reader is directed for further information. This third mode also offers additional flexibility by retaining a programmable microprocessor and access to custom hardware. APC is also capable of dynamic switching between these modes. Such a feature may prove useful in many applications. For instance, such a feature may prove useful if multiple data channels are part of the same payload, then the APC's operating mode can be switched to better serve the needs of the active data channel.

APC's flexibility allows one to adopt the target processor for a variety of mission level requirements. As just one example, enhanced efficiency may be achieved by using more custom hardware modules in FPGA. Similarly, enhanced processing performance may also be realized in FPGA modules. However, for certain applications that may require enhanced programmability, microprocessor mode might be a more suitable application. Utilizing an APC can facilitate these needs. Moreover, other implementation alternatives are not typically available in on-board processor modules. An example of the APC's flexibility is in a processing situation where there is a mix of control flow as well as data flow processing on the same computer. Control flow applications are generally more likely to be sequential where data flow tends to be more parallel. In the case of sequential applications, a microprocessor may yield acceptable performance results. However, parallel applications can better use the FPGA co-processor to accelerate their processing.

Certain relevant features of a preferred APC, such as APC 80, are provided below in Table 2.

TABLE 2

APC Features
Features 750 fx @ 650 MHz Delivering 1300 MIPS
VirtexII 6000 Processing Element/Processor Controller
PCI 32-bit 33 MHz
Rapid I/O
128 MB DRAM with Super EDAC
4 MB EEPROM with SECDED EDAC
Configuration Manager with support FPGA
SEU mitigation
PCI-to-PCI bridge facilitating a local PCI bus
Ethernet development interface
6 U x 220 mm Euro Card Form Factor
Mass <3 lbs
Max Power Draw 20 W Returning to FIG. 2, target computer 50 further comprises a packet switched fabric A 60 and packet switched fabric B 62. Preferably, the various modules comprising system 50 are interconnected via a packet switched fabric based on a RapidIO ("RIO") industry standard. Additional information on this industry standard, the reader is directed to RapidIO Trade Association Web site at http://www.rapidio.org/ herein entirely incorporated by reference and to which the reader is directed to for further information.

RIO is an industry standard and is generally recognized as one of the more popular, conventional COTS interconnect. Certain conventional payload data processor interconnects are based upon multi-drop configurations. Such multi-drop configurations include but are not limited to MODULE BUS, PCI and VME. One advantage of such multi-drop systems is that they distribute available bandwidth over each module. However, this may result in producing points of contention among participant nodes often resulting in system level bottlenecks.

In contrast to such multi-drop systems, RIO implements a packet-switched, point-to-point interconnect. Such an interconnect has certain advantages. For example, packet-switched, point-to-point interconnects allow, multiple full-bandwidth point-to-point links to be simultaneously established between end-nodes in a network. Another advantage of packet-switched, point-to-point interconnects is that they reduce contention while also delivering more bandwidth to an application.

Figure 4:
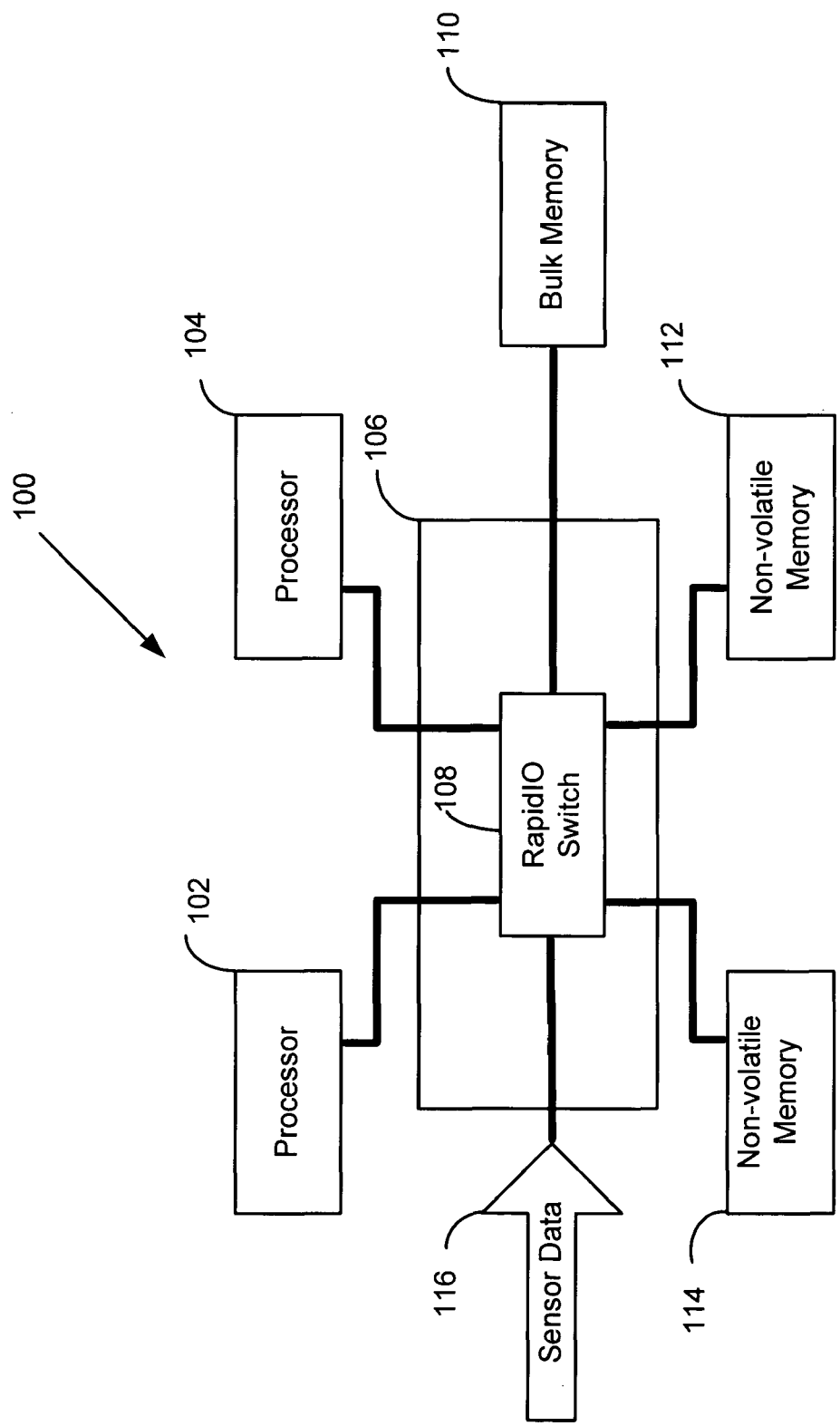
FIG. 4 illustrates one arrangement of a rapid I/O system that may be utilized with the target computer illustrated in FIG. 2.

FIG. 4 illustrates one arrangement of a rapid I/O ("RIO") system 100 that may be utilized with target computer 50 illustrated in FIG. 2. RIO system 100 comprises sensor data 116, two processors 102 and 104, a rapidIO switch 108, bulk memory 110, general purpose I/O 114, a backplane 106, and non-volatile memory 112.

RIO system 100 comprises essentially two building blocks: a RIO end-node 120 and a RIO switch 122. Each end-node 120, 122 in RIO system 100 comprises a RIO network interface. Each RIO network interface comprises a point-to-point link to shared RIO Switch 108. RIO switch 108 receives and routes packets to the appropriate destination over backplane 106. The non-blocking nature of RIO allows concurrent routing of multiple packets. For example: sensor data 116 may be stored in bulk memory 110 at the same time as processors 102, 104 access general purpose I/O 114. By using multiple switches as illustrated in FIG. 4 in the EAFTC system 10 of FIG. 1, topologies consisting of hundreds or thousands of nodes may be achieved.

In one preferred arrangement, RIO interfaces are based on LVDS signaling technology and can achieve bandwidths of up to 60 Gbits/s for each active link. A 16 bit RIO system with two active point-to-point links is capable of 120 Gbits/s providing >120× performance increase over a 33 MHz 32 bit Compact PCI based system.

One benefit of a RIO protocol is this protocol's error detection and recovery mechanism. By combining retry protocols, cyclic redundancy codes ("CRC") and single/multiple error detection, RIO handles all in network errors without application intervention. This inherent error handling and recovery capability proves beneficial for certain applications that may require a generally high reliable interconnect, such as space applications.

Environmental Sensor Suite

Returning to FIG. 2, target computer 50 further comprises an environmental sensor suite 58. Therefore, EAFTC system 10 relies, to a certain extent, on an ability to sense its environment. As part of PSI's Reconfigurable Environmentally-Adaptive Computing Technology (REACT), a miniature embedded radiation monitor, the SEU Alarm has been developed. The SEU Alarm is based on certain flight-proven technology originally developed for PSI's radiation diagnostic instrumentation. General background information on this radiation diagnostic instrumentation may be obtained from Physical Sciences Inc. Web site http://www.psicorp.com/index.shtml herein entirely incorporated by reference and to which the reader is directed to for further information. Advantages of a SEU Alarm over conventional sensors are its relatively small foot print and that the Alarms are designed to support SEU rate predictions.

Figure 5:
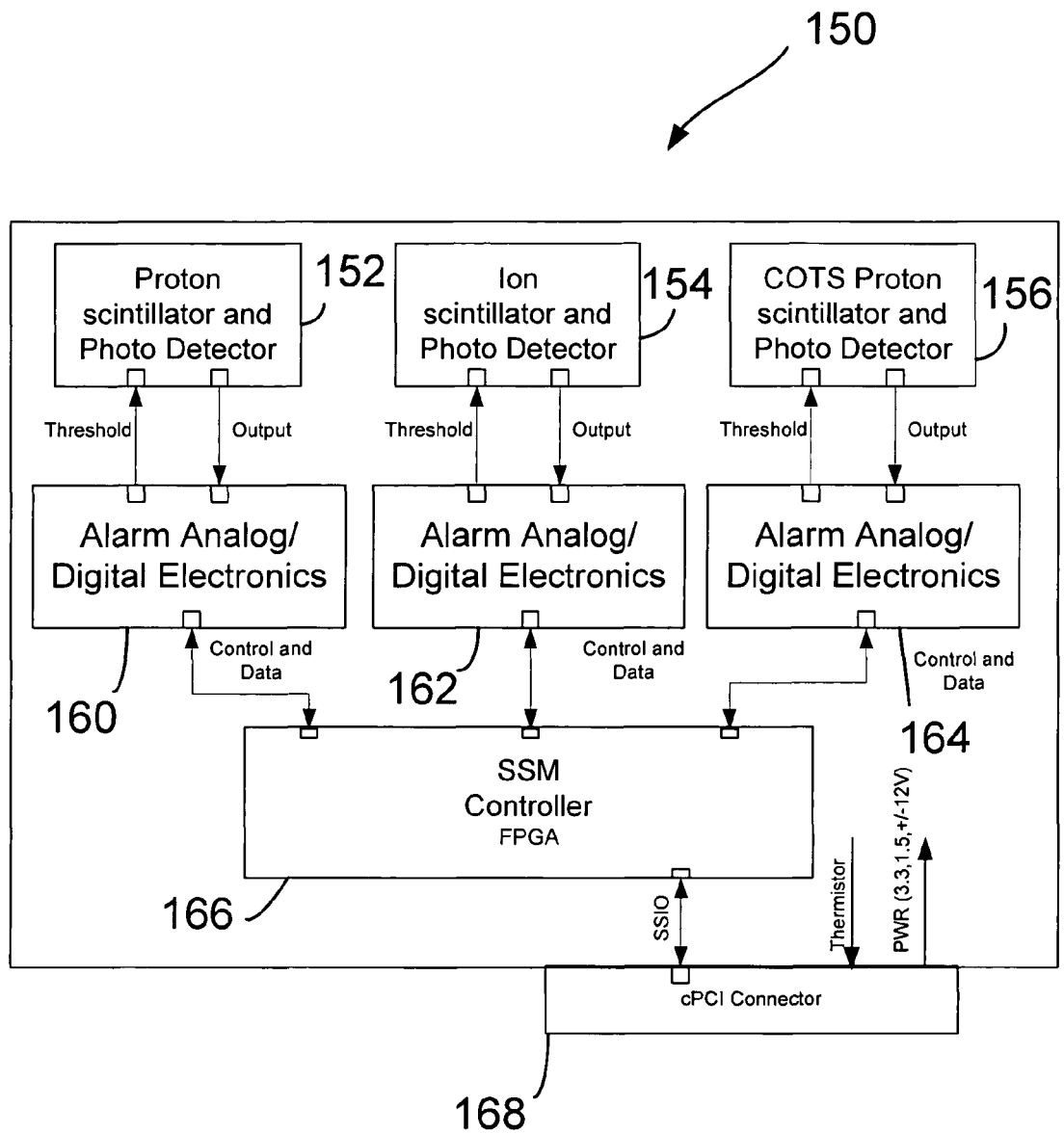
FIG. 5 illustrates one arrangement of an alarm module that may be utilized with the target computer illustrated in FIG. 2.

In one arrangement, SEU alarm (shown as alarm 22 in FIG. 1) provides continuous monitoring of proton and heavy-ion fluxes that cause single event upsets. In one preferred arrangement, SEU alarm comprises a small block of scintillators coupled to a photo-detector. For example, FIG. 5 illustrates one such arrangement of a SEU alarm module 150. Module 150 comprises three sensors 152, 154, 156, respectively coupled to three controller electronics 160, 162, and 164. Module 150 further comprises a controller 166, and a network interface 168. Controller 166 provides the control and interface register for software interface to the sensor modules. Software configures each sensor for a given application by setting alarm thresholds and refresh rates. Software can also access the alarm measurements for use in evaluating the threat to the system.

SEU alarm 150, by way of sensors 152, 154, 156, provides continuous monitoring of the proton and heavy-ion fluxes that cause single event upsets. The basic components of the SEU Alarm are a small block of scintillators coupled to a photodetector. In one preferred arrangement, a number of these devices can be consolidated onto a single module.

Software Framework

Figure 6:
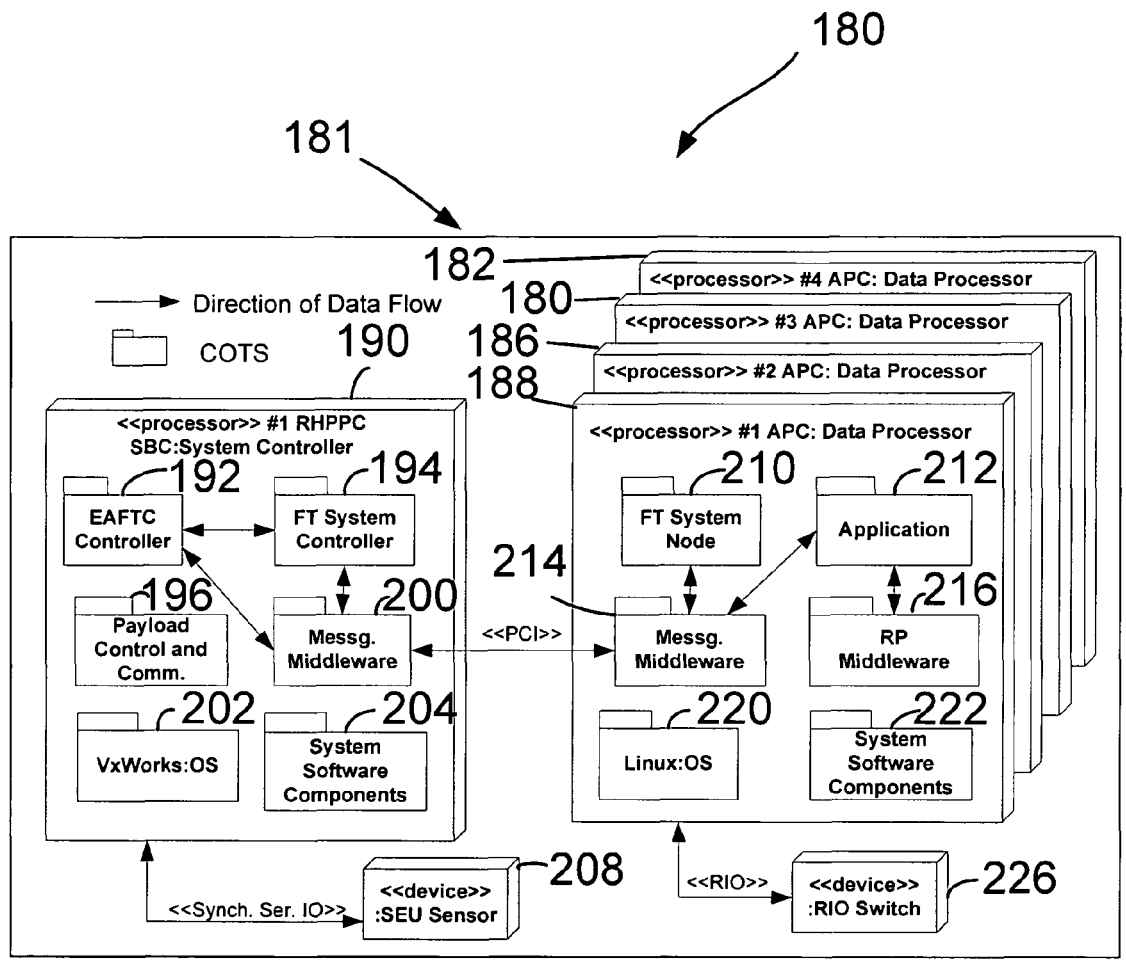
FIG. 6 illustrates a software framework for the target computer illustrated in FIG. 2.

FIG. 6 illustrates a preferred software framework 180 for a target computer, such as the target computer 16 illustrated in FIG. 1. Software framework 180 comprises an operating system/system software, fault tolerant system controller/node, EAFTC controller 192, messaging middleware 200, and reliable platform middleware 216. One objective of the target computer software framework is to provide system developers with a stable yet familiar software platform. In FIG. 6, the software comprises mission specific payload control 196 and communications hosted on system controller 194, and application processes distributed across data processor cluster 181. These software components may be developed using COTS environments and associated Application Program Interfaces ("APIs").

In one preferred arrangement, the proposed Operating Systems are VxWorks 202 for System Controller 194 and Linux for Data Processor cluster 181. Information on this proposed Operating System by VxWorks may be found at Wind River Systems Web site http://www.windriver.com/ which is herein entirely incorporated by reference and to which the reader is directed for further information.

VxWorks OS 202 provides the capabilities necessary for the deployment of real-time control processes such as those implemented by EAFTC controller 192, fault tolerant system controller 194, and payload control and communications 196. VxWorks OS 202 also provides a familiar platform for developers of these types of applications. Data processor cluster 181, unlike system controller 194, is the domain of the science application developer. In this case, Linux OS 220 is a preferred OS due to its popularity in the scientific community. To mitigate concerns associated with the interaction of heterogeneous operating systems, a COTS messaging middleware 214 may also be introduced. For example, the messaging component of GoAhead's SelfReliant Middleware provides a common interface for communication between Linux OS 220 and VxWorks OS 202 along with a variety of practical messaging services such as publish-subscribe, and replicated databases. See, e.g., GoAhead Web site http://www.goahead.com/ which is herein entirely incorporated by reference and to which the reader is directed for further information.

Messaging within data processor cluster 181 may be accomplished via Reliable Platform (RP) Middleware 216, which is also responsible for the Software Implemented Fault Tolerance (SIFT) in the cluster. C. J. Walter, P. Lincoln and N. Sun, "Formally verified on-line diagnosis," IEEE Trans. on Software Engr., vol. 23, #11, pp. 684-721, November 1997 which is herein entirely incorporated by reference and to which the reader is directed to for further information. Together, the OS and Middlewares provide the base platform on which other software may be implemented.

EAFTC and RP Middleware

In one preferred arrangement, EAFTC comprises essentially two software components: a Reliable Platform Middleware (RP) and an EAFTC controller.

1. EAFTC Controller or System Configuration Controller

EAFTC controller or system configuration controller provides control of an EAFTC based system illustrated in FIG. 1. Since the integrity and dependability of the EAFTC system relies on this controller its realization must be highly reliable. Hence, the EAFTC may be selected to be implemented as a software component hosted on a reliable system controller. One advantage of such a system is that this implementation provides an enhanced level of flexibility for future use and adaptations.

Figure 7:
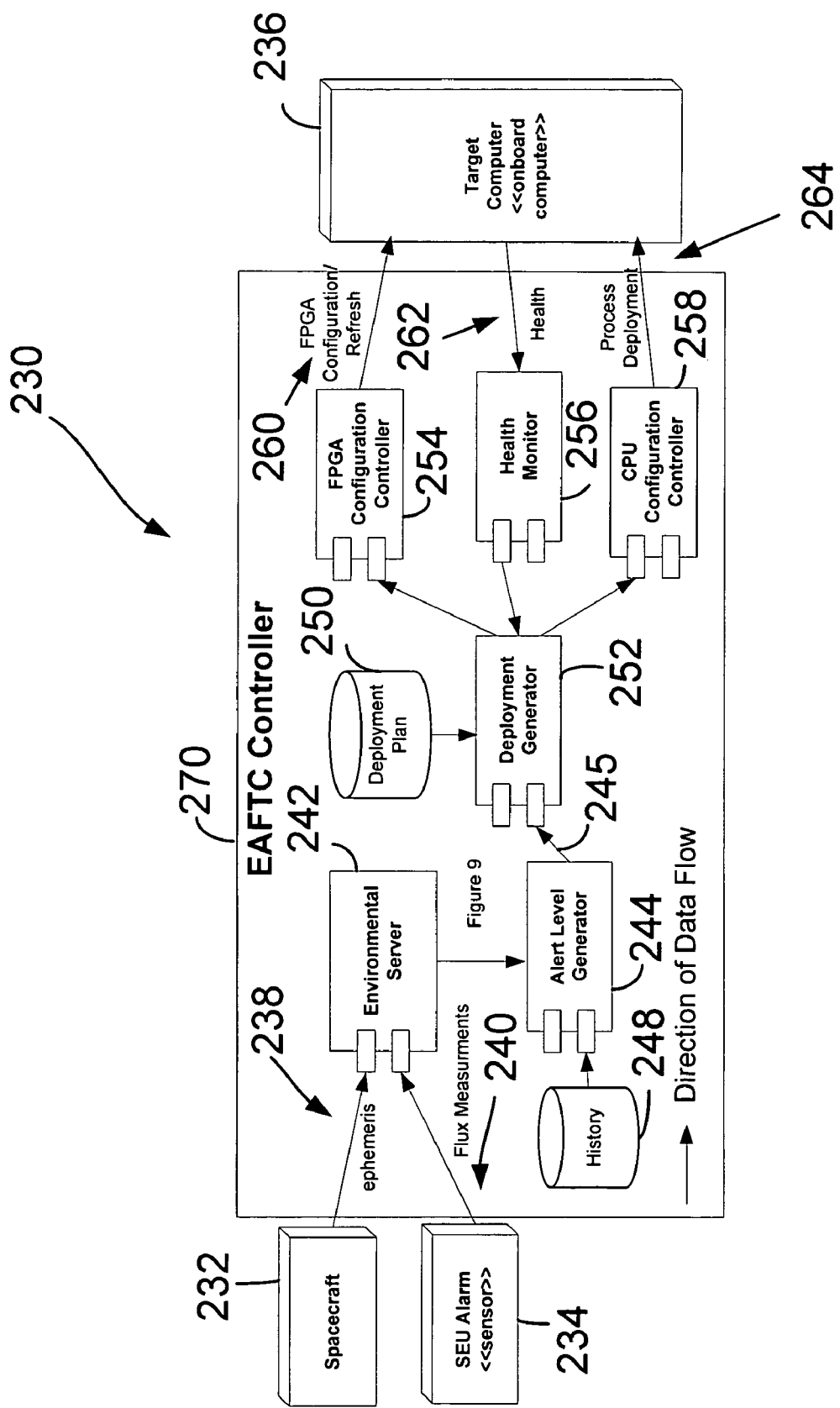
FIG. 7 illustrates an exemplary block diagram of the EAFTC controller illustrated in FIG. 1.

FIG. 7 depicts an overview 230 of internal functions of a system controller 270 in the context of a characteristic system implementation. The general description of the various components comprising one preferred arrangement of a system controller is provided below.

In one arrangement, a system controller 270 comprises an Environmental Server 242, Alert Level Generator 244, Deployment Plan 250, Deployment Generator 252, FPGA Configuration Controller 254, Health Monitor 256, and CPU Configuration Controller 258. Given a variety of possible sensory input, a function has been defined to collect and organize sensor signals into abstract representations that may be shared with other EAFTC components. Environmental Server 242 encapsulates the low-level interfaces to each of the sensors in the system, including the sampling of each signal. In the arrangement illustrated in FIG. 7, this would be from spacecraft 232 and SEU Alarm 234.

Health Monitor

Health Monitor 256 monitors a state 266 of each target system computer resource 236. Signals such as heartbeats, redundant output consistency mismatches, watchdog time-out, etc are collected via Fault Tolerant Controller/Node components. These signals are then provided to Health Monitor 256. Given predefined policies, Health Monitor 256 makes a determination of the health for each Data Processor in an APC cluster, such as APC cluster 64 illustrated in FIG. 2 and APC cluster 181 in FIG. 6. This information is then shared with Deployment Generator 252 where it is used in determining the system's task deployment from Deployment Plan 250.

History Database

Although reacting to immediate sensory input may be adequate for certain applications, the ability to predict near future threats to an EAFTC system provides certain advantages. In particular, adapting fault tolerance to address anticipated threats reduces an exposure of the system to faults. History Database 248 is a component of a predictive filter implemented in Alert Level Generator 244. As just one example, sensor measurements from a previous spacecraft orbit may be maintained in History Database 248 and subsequently retrieved by Alert Level Generator 244 for use by Deployment Generator 252.

Alert Level Generator

The process of evaluating an environmental threat to an EAFTC system is implemented in Alert Level Generator 244. Given the current sensory input received from spacecraft 232 and/or SEU Alarm 234, Historical Database 248, and a set of system specific thresholds, Alert Level Generator 244 outputs a discrete threat level 245 for EAFTC system. An important algorithm of Alert Level Generator 244 is an Adaptive Linear Predictive Filter. This Adaptive Linear Predictive Filter generates a particle flux prediction. Based on this particle flux prediction, a series of user defined thresholds may be evaluated to determine a current system alert level to be used by a Deployment Generator in determining EAFTC system's process deployment.

Deployment Plan

The on-line behavior of an EAFTC controller may vary based on a target environment, system level requirements, target application, target system architecture, and other implementation specific factors. This application specific behavior may be captured as a user defined parameter set. In particular, the Deployment Plan describes the desired system dependability for a given spacecraft position, threat level, and time. The Deployment Plan may be defined by the requirements of each individual application process.

Deployment Generator

Once the system threat level has been assessed, Deployment Generator 252 acts to counter the threat. Given a particular Deployment Plan 250, target system health 262, and alert level 245, Deployment Generator 252 produces a new system deployment. The process of generating a new deployment is primarily based on determining a lowest cost distribution of application processes (including number of replicas) across available target resources. The generated deployment is then sent to each node in a cluster where local actions implemented by Fault Tolerant Node software fulfill the deployment requests. Specifically, in one arrangement, Fault Tolerant Node collaborates with RP Middleware, as discussed in greater detail below, to deploy fault tolerance as requested.

Configuration Controllers

CPU Configuration Controller 258 is designed to interface with a particular target system 236 and provide process deployment 264. Where more than Configuration Controller 258 is implemented and given a new deployment, each Configuration Controller generates the low-level signals to effect required changes in a targeted system. In a preferred arrangement, two Configuration Controller types are implemented. The first Configuration Controller is responsible for interaction with APC nodes operating in microprocessor mode. The second Configuration Controller interacts with APC nodes operating in custom processor mode.

Reliable Platform ("RP") Middleware

The role of WW Technology's RP in the overall EAFTC solution is that of Software Implemented Fault Tolerance (SIFT). SIFT is a fault tolerant technique that relies on software to provide redundancy at the process level. (See, e.g., Daniel P. Siewiorek and Robert S. Swarz, Reliable Computer Systems Design and Evaluation $3^{rd}$ edition, MA: AK Peters Ltd., 1998 herein entirely incorporated by reference and to which the reader is directed for further information.) The RP manages the fault tolerance of applications and services distributed across clusters of processors by establishing a consistent framework and common context in which the system operates.

In one preferred arrangement, RP consists of a set of services that facilitate the implementation of reliable systems through the dependable management of redundant/replicated resources. RP addresses the needs of composing systems utilizing COTS hardware and software components, as it offers a software based solution that provides transparent Fault Detection, Isolation and Removal ("FDIR") services, enabling hosted applications to provide uninterrupted delivery of service in the presence of faults.

Figure 8:
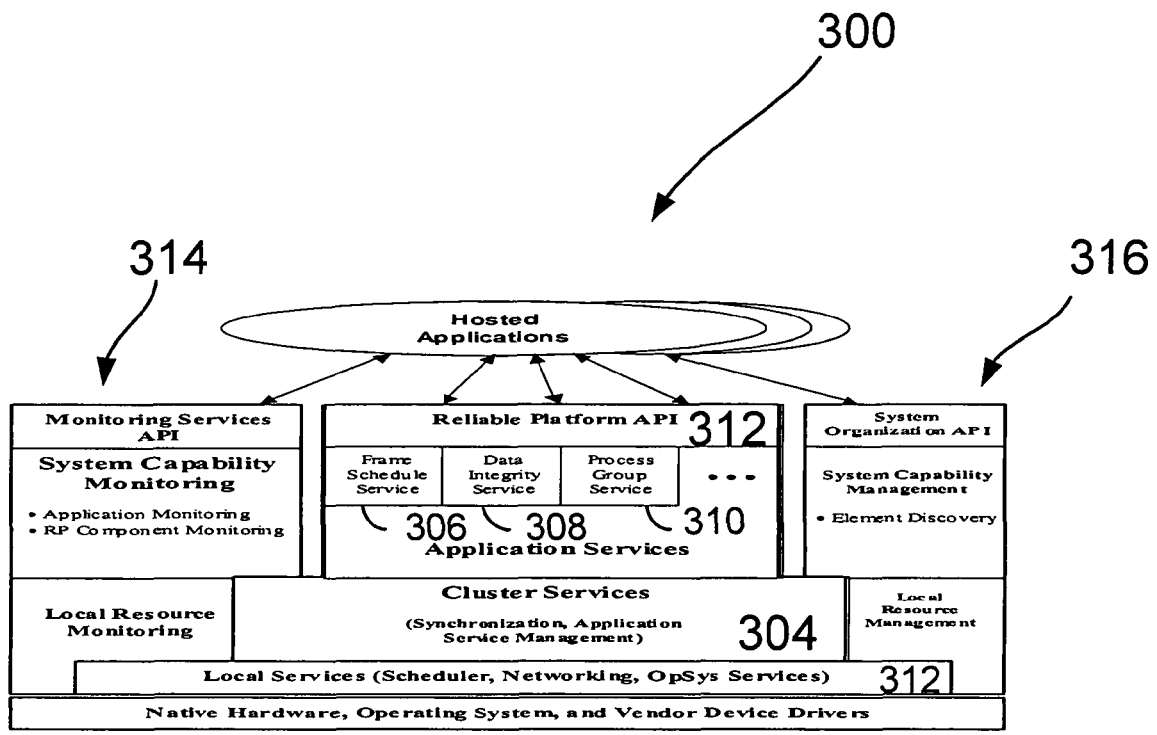
FIG. 8 illustrates an exemplary block diagram of reliable middleware that may be utilized with the EAFTC controller illustrated in FIG. 1.

FIG. 8 illustrates an exemplary block diagram 300 of reliable middleware that may be utilized with the EAFTC controller illustrated in FIG. 1. FIG. 8 depicts a block diagram of the RP and its relationship to other software elements of the system. The main RP framework components are described as follows.

Local Services 302 are services that are local to each processor in the distributed system. These services provide local functionality required for a processor to perform useful work in a cluster. Examples of these types of services include but are not limited to networking, local scheduling, timing, and inter process communications.

Cluster Synchronization 304 establishes a dependable distributed time base that is consistent across the entire system. This service is based on a message passing technique and uses local physical clocks at each component to form a logical system clock. Preferably, Cluster Synchronization 304 is scalable and efficiently establishes the time base across processors. This time base may be used as a backbone for scheduling distributed operations across the cluster.

System Configuration Services 306 establish and control the configuration of the cluster. The cluster configuration comprises the system physical resources and logical capabilities. The System Configuration Service interacts directly with the EAFTC Fault Tolerant Node component. This in turn communicates with Fault Tolerant Controller. EAFTC controller sends its generated deployment via Fault Tolerant Controller/Node to each processor's System Configuration Service where deployment changes are finally effected.

System Monitoring Services 314 supplies the system with an ability to dynamically assess the health of the cluster and localize failed processors and application processes. Assessments are made with a cluster wide perspective using distributed decision-making and integrated monitoring information from across the cluster. Failure notifications from this service may be forwarded to the EAFTC Health Monitor via the Fault Tolerant Controller/Node components.

Process Group Management In one preferred approach for enhancing the availability and dependability of payload applications relies on replication. The set of replicated instances are managed as a "process group." This is a peer-to-peer entity in which the support services of each replica are constantly checking the performance/behavior of its local replica against that of its remote peers.

Scheduling provides a scheduling mechanism that is available to the hosted applications. This mechanism initially provides indications to application processes as to when to perform its execution cycle and when interaction with other support services may be performed. This scheduling mechanism is based on the common time base established through cluster synchronization. Operations controlled by this scheduling service can be coordinated in time across all elements of the cluster.

Data Integrity 308 provides consistent data sets across replicas. A deviation from this consistent data by a replica is to be interpreted as an error by that replica. This capability allows hosted applications to expose internal state data facilitating warm starts of additional resources as they come on-line. Additional replicas may join an established group by adopting the internal state of the existing replicas.

RP 312 offers its services in a flexible manner, supporting a distribution of applications that is not necessarily tied to the physical realization of the cluster. In one preferred arrangement, RP utilizes a clustering approach to manage a cluster processor. Application replicates are hosted on each RP-Enabled resource via RP Interface (RPI). This renders the application "unaware" of the fact that it has been replicated, or to what extent it has been replicated. RP works in the background to monitor application behavior and recognizing when a fault has resulted in application divergence. RP not only provides dependability to hosted applications, but RP is in-and-of itself dependable, capitalizing internally on the same techniques and properties conveyed to hosted applications.

Figure 9:
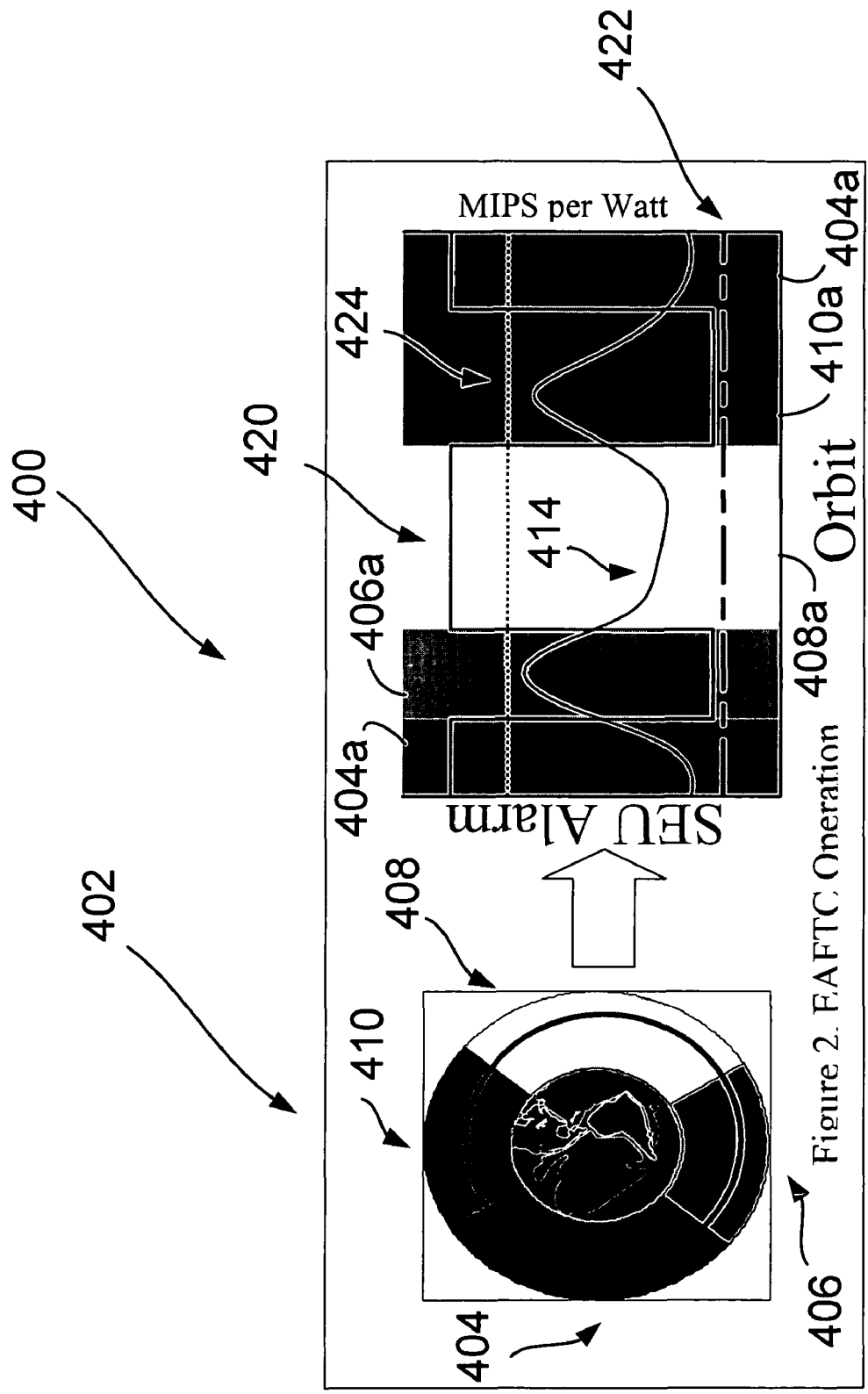
FIG. 9 illustrates one example of applying the EAFTC system illustrated in FIG. 1.

The EAFTC system combines a set of innovative technologies to enable a system and/or method for the efficient use of high performance COTS processors while these processors operate in generally harsh space environments. An enhanced level of performance may also be achieved while also maintaining a certain required system availability. For example, FIG. 9 illustrates one example 400 of applying the EAFTC system illustrated in FIG. 1. On the left side of FIG. 9, a particular satellite's orbit 402 is illustrated as comprising a set of four regions. These regions comprise a first region 404, a second region 406, a third region 408, and a fourth region 410. Each region 404, 406, 408, 408, and 410 has associated therewith a varied radiation environment. Although only four regions and four radiation environments are illustrated, those of ordinary skill in the art will recognize that more or less than four regions may be employed.

As the EAFTC system travels through orbit from one region to the next region, the system collects measurements of the SEU Alarm response to the radiation. This SEU Alarm response 414 is illustrated as a function of orbit position (404a-410a), fluctuating as the space borne craft traverses from one region to the next. The EAFTC system dynamically creates regions based on these measurements and based in-part on the on-board processing system's sensitivity to radiation.

As the EAFTC system enters and leaves a particular region, the system dynamically configures the fault tolerance to match the environment. The overall result is an increase in the system's performance as depicted by curve 420. Curve 420 represents the EAFTC system's instructions per unit of power, in this case Millions of Instructions Per Second Per Watt ("MIPS/Watt"). When compared to a conventional system designed for a worst case scenario, illustrated as a first alternative line 422, the average performance of an EAFTC system illustrated as a black dotted line 424 will be higher. Though the overall performance gain depends on a particular orbit and the on-board processing system's sensitivity and adaptability, EAFTC provides a solution that is just as good if not better than the conventional approach.

Therefore, the EAFTC system as illustrated in FIG. 1 mitigates faults, and in particular SEUs in COTS devices. Such fault mitigation is accomplished while also increasing the system's overall efficiency and capacity. EAFTC system 10 accomplishes this feat by optimally applying fault tolerance over the life of the mission as demanded by the task criticality and environmental measurements.

The proposed EAFTC system results in a novel technology for on-board payload processing. The disclosed EAFTC is a COTS based computing system architecture and associated system control algorithms that together provide a reliable on-board processing platform. Applicants' EAFTC system senses an environment, assesses the fault threat presented by the environment, and adjusts the processing system's fault tolerance to thereby effectively mitigate certain threats presented by the environment. In this manner, EAFTC optimally employs fault tolerance based on historical and environmental conditions. EAFTC can therefore also increase the overall system efficiency, in terms of unit of computations per Watt.

Exemplary embodiments of the present invention have been described. Those skilled in the art will understand, however, that changes and modifications may be made to these embodiments without departing from the true scope and spirit of the present invention, which is defined by the claims.

We claim:

1. A method of adapting fault tolerant computing, said method comprising the steps of: measuring an environmental condition representative of an environment; analyzing an on-board processing system for sensitivity to said measured environmental condition; and determining whether to reconfigure a fault tolerance of said on-board processing system, based at least in part on said measured environmental condition, with a controller comprising: an alert level generator configured to evaluate a potential environmental threat based on said measured environmental condition, the alert level generator comprising an adaptive linear predictive filter that generates a particle flux prediction; a deployment plan that is user definable to describe one or more application tasks and system thresholds; and a deployment generator configured to receive data from the alert level generator and the deployment plan.

2. The method of claim 1 further comprising the step of reconfiguring said fault tolerance of said on-board processing system based in part on said measured environmental condition.

3. The method of claim 2 wherein said fault tolerance of said on-board processing system is reconfigured to match said environment.

4. The method of claim 2 wherein said fault tolerance of said on-board processing system is reconfigured based in part on historical data.

5. The method of claim 1 wherein said step of measuring said environmental condition occurs during an orbit position of said on-board processing system.

6. The method of claim 1 wherein said on-board processing system is included in a space borne asset.

7. The method of claim 1 wherein said step of measuring environmental conditions comprises the step of detecting radiation conditions.

8. The method of claim 1 wherein said step of measuring said environmental condition comprises monitoring flux of high-energy particles that cause single event upsets.

9. The method of claim 1 further comprising providing an alarm suite, said suite providing an alarm signal representative of an environment threat.

10. The method of claim 1 further comprising the step of collecting measurements of an alarm in response to said environmental condition on a space borne spacecraft.

11. The method of claim 10 wherein said step of collecting measurements of an alarm in response to said environmental condition further comprises the step of
 sensing proton and heavy-ion fluxes in space.

12. The method of claim 10 further comprising the step of generating a particle flux prediction based in part on said collected measurements of said environmental condition.

13. The method of claim 1 further comprising the step of operating said on-board processing system in a plurality of operational modes, said on-board processing system comprising a COTS processor.

14. The method of claim 1 wherein said step of determining whether to reconfigure said fault tolerance of said on-board processing system further comprises the step of
 predicting a near future threat of said system.

15. A system for environmentally adaptive fault tolerant computing, said system comprising: a sensor that senses a characteristic of a dynamic environment and generates an output signal based on said characteristic; a system configuration controller that is executable by a processor and that receives said output signal, said controller assessing a potential environmental threat to an availability of said system based at least in part on said output signal, said controller comprising: an alert level generator configured to evaluate the potential environmental threat, the alert level generator comprising an adaptive linear predictive filter that generates a particle flux prediction; a deployment plan that is user definable to describe one or more application tasks and system thresholds; and a deployment generator configured to receive data from the alert level generator and the deployment plan; and a computing device that receives an input from said controller; wherein a configuration of said computing device is adapted to effectively mitigate said potential environmental threat to the availability of said system.

16. The system of claim 15 wherein said sensor comprises an environmental sensor suite.

17. The system of claim 15 wherein said sensor senses radiation conditions.

18. The system of claim 15 wherein said computing device is a payload computer system.

19. The system of claim 15 wherein said controller assessing said potential environmental threat to said availability of said system is based in part on said input and also in part on previously measured environmental conditions.

20. The system of claim 15 wherein said controller operates in a plurality of operational modes.

21. The system of claim 15 wherein said controller comprises a COTS processor.

22. A system for environmentally adaptive fault tolerant computing, the system comprising: an environmental sensor suite comprising: a plurality of sensors including at least one single event upset alarm that provides an alarm signal representative of a potential environmental threat; a controller that is executable by a processor and in operative communication with the environmental sensor suite, the controller comprising: an environmental server configured to receive sensory input signals from the plurality of sensors; a history database configured to contain prior sensor measurements; an alert level generator configured to evaluate the potential environmental threat based on the sensory input signals and the prior sensor measurements, the alert level generator comprising an adaptive linear predictive filter that generates a particle flux prediction; a deployment plan that is user definable to describe one or more application tasks and system thresholds; a deployment generator configured to receive data from the alert level generator and the deployment plan; and a computer health monitor in operative communication with the deployment generator; and a computer comprising at least one data processor in operative communication with the controller and configured to effectively mitigate the potential environmental threat; wherein the deployment generator of the controller is configured to evaluate the potential environmental threat to the computer based on data from the deployment plan, the computer health monitor, and the alert level generator, and send a deployment signal to the computer to counter the potential environmental threat.

* * * * *